atent [19]

United States Patent [19]

Hatch

[11] 4,042,665

[45] Aug. 16, 1977

[54] COBALT ION EXCHANGE PROCESS

[75] Inventor: William Ronald Hatch, Bolton, Canada

[73] Assignee: Falconbridge Nickel Mines Limited, Toronto, Canada

[21] Appl. No.: 726,994

[22] Filed: Sept. 27, 1976

[51] Int. Cl.$^2$ .................................................. C22B 23/04
[52] U.S. Cl. ................................ 423/139; 75/101 BE; 75/117; 75/119; 423/24
[58] Field of Search ................ 75/101 BE, 119, 117; 423/139

[56] References Cited

U.S. PATENT DOCUMENTS

| | | | |
|---|---|---|---|
| 3,003,866 | 10/1961 | Mattano | 423/139 X |
| 3,082,081 | 3/1963 | Howe et al. | 423/139 |
| 3,170,760 | 2/1965 | Morbidelli et al. | 423/139 |
| 3,235,377 | 2/1966 | Hard et al. | 423/139 X |
| 3,399,055 | 8/1968 | Ritcey et al. | 423/139 X |
| 3,402,042 | 9/1968 | Lichty | 423/139 |
| 3,438,768 | 4/1969 | Ashbrook et al. | 75/101 BE |
| 3,607,236 | 9/1971 | Brooks | 75/119 X |
| 3,821,354 | 6/1974 | Gandon et al. | 423/139 |
| 3,998,627 | 12/1976 | Weir et al. | 75/101 BE |

*Primary Examiner*—G. Ozaki

[57] ABSTRACT

There is provided a cobalt ion exchange process for recovering cobalt from ammoniacal solutions comprising the steps of bringing the ammoniacal solution into contact with carbonaceous material, the redox potential of the solution being in the range +20 to −150 mV as measured by a platinum-calomel standard electrode pair, extracting the cobalt from the leach solution with a cationic ion exchange reagent, and recovering substantially all the cobalt from the ion exchange reagent by elution. The process of the invention enables cobalt to be removed from an ammoniacal leach solution which may also contain nickel and copper, in the form of a highly pure cobalt eluate.

22 Claims, No Drawings

COBALT ION EXCHANGE PROCESS

FIELD

This invention relates to the recovery of metals from solution, being particularly directed to the recovery of cobalt from ammoniacal solutions. Specifically, in the process of the present invention, ammoniacal cobalt complexes are extracted by ion exchange means and cobalt is recovered in an aqueous phase by subsequent elution of the loaded extractant with dilute acid.

BACKGROUND

Ammoniacal leaching systems for the recovery of metals from ores such as laterites or sulphides have been known for some time. Nickel, copper and cobalt form ammine complexes in ammonia-bearing solutions, whereas iron and some other metals do not. This feature is exploited to effect a separation of metal valves from unwanted species in such ores by leaching with an ammonia-bearing solution. Recently, for example, attention has been directed to treating deep sea manganese nodules by ammonia leaching to selectively recover the contained copper, nickel and cobalt while leaving as residue the less valuable manganese that makes up the bulk of these ores.

Recovery of the dissolved nickel and copper from the ammoniacal leach solutions can be accomplished by a variety of well-documented means including, for example, steam stripping or pressure reduction with hydrogen. This invention is primarily directed however, to a recently developed field of art in which the metal values are recovered by solvent extraction with organic reagents and the resulting raffinate (barren leach solution) is recycled to the leaching operation. Cobalt-containing ores present a serious problem to progress in this art because cobalt can build up either in the aqueous or organic phases depending upon its valence.

It is well-known that divalent cobalt in ammoniacal solution is co-extractable with copper and nickel by many organic reagents but, unfortunately, the organic holds the cobalt so tenaciously that, either it cannot be removed, or, requires such severe stripping conditions as to make the process impracticable. It is more usually the case that cobalt is present as a trivalent species in ammoniacal solutions as a result of the oxidizing conditions used in ammonia leaching. Under these conditions it is equally well-known that cobalt will not extract into most organic reagents during copper and nickel extraction but remains behind in the ammoniacal raffinate. In either case, therefore, cobalt builds up in the process cycle. If it builds up in the organic phase the active reagent sites therein are poisoned and the ability of the reagent to pick up copper and nickel is progressively reduced. Alternatively, a cobalt build-up in the ammoniacal solution gradually decreases the leaching power of the raffinate each time it is recycled. In this regard, evidence is available that the presence of cobalt in ammoniacal solutions, even in small quantities, can adversely affect the leaching of metallic nickel from certain ore materials.

Most attempts in the art to solve the cobalt problem have centered on methods to selectively extract cobalt in the presence of nickel and copper and then selectively elute the loaded organic phase to recover nickel preferentially. Typical of such processes are those described in U.S. Pat. Nos. 3,438,768 and 3,728,366. In both of these patents, however, the selectivity of the extraction or elution operations is inadequate, and additional steps, such as selective scrubbing or secondary elution of the loaded organic reagent, are required to generate cobalt eluates that are acceptably low in nickel content. Apart from the general lack of adequate selectivity evident in these methods, each method has additional specific disadvantages that include severe elution conditions, high reagent costs and high solubility of the organic phase in the ammoniacal solution. These and similar processes are held as being evidently unsatisfactory on the grounds that they have not yet found commercial application.

In contrast, a commercially used process does exist that provides a quantitative separation of cobalt (in the trivalent state) from nickel and/or copper. The process is described by Drobnick et al. in U.S. Pat. No. 3,276,863 and employs as extraction agents alpha-hydroxy oximes sold commercially by General Mills under the trade name LIX. Copper and nickel are extracted and cobalt is left behind as a dilute species in the raffinate phase. Unfortunately, means are not yet known whereby the cobalt can be satisfactorily recovered from the raffinate before the latter is recycled to the leach. To date, in the absence of any workable solvent extraction method for cobalt, cobalt recovery from these raffinates is based on precipitation processes such as precipitation of cobalt sulphide using hydrogen sulphide or, in another method, the precipitation of cobalt carbonate by stream stripping ammonia from the raffinate. The former method produces a precipitate with poor handling properties and a tendency to sulphation by air, and also introduces undesirable sulphide ions into the solution. In the latter process, steam stripping huge quantities of ammonia from barren solutions to recover the small amount of contained cobalt is simply uneconomic.

It is apparent from this discussion that adequate means do not yet exist to recover cobalt from ammoniacal solution by solvent extraction. It is felt that part of the reason for this is the complexity of cobalt ammine chemistry, many areas of which are still the subject of theoretical debate. Cobalt forms a great variety of ammine complexes, many of which usually co-exist in any given ammoniacal solution. The prior art has failed to distinguish between these species with respect to their recovery by solvent extraction. U.S. Pat. No. 2,848,322 discloses a method for separating cobalt from nickel by absorbing ammine complexes of both metals onto cationic exchange resins. The inventors, however, point out that several cobalt ammine complexes are probably present in their solutions. The method yields a satisfactory nickel eluate, but significantly, the majority of the cobalt can only be recovered from the resin by soaking in concentrated hydrochloric acid for a period of several hours.

Information concerning specific cobalt ammines is confined almost exclusively to analytical and preparative inorganic chemistry. For example, it is known to prepare cobalt hexammine by oxidizing acid solutions of divalent cobalt in the presence of ammonia and activated carbon. The method is only directed, however, to the preparation of the hexammine for structural studies and the like, and nothing is taught concerning the solvent extraction properties of the ammines.

The present state of the art is best summarized by a very recent reference from the May 1976 issue of "Hydrometallurgy". In an article beginning page 319, it is shown that a method for converting cobalt in ammoniacal solution to the hexammine complex prior to its absorption on the resin would be highly desirable. The article points out, however, that recent tests aimed at generating the complex were not encouraging and a pressurized ion exchange technique would be required, either alone or in combination with the precipitation methods described hereinbefore.

A process has now been discovered that recovers cobalt by ion exchange means. The method does not require elevated pressures and can be applied to a wide variety of cobalt-bearing ammoniacal solutions, including those which also contain nickel and copper. A cobalt ammine complex is extracted that is readily eluted from the organic phase to produce a cobalt eluate of high purity.

OBJECT OF THE INVENTION

It is an object of the present invention to provide a process for the recovery of cobalt from ammoniacal leach solutions.

It is a further object of the invention to recover cobalt in the form of a highly pure cobalt eluate.

SUMMARY OF THE INVENTION

Broadly speaking, the invention contemplates a method for recovering cobalt from ammoniacal leach solution comprising, i. adjusting the redox potential of the solution into the range of +20 to −150 mV as measured by a platinum-calomel standard electrode pair.

ii. bringing the solution into contact with carbonaceous material, thereby rendering the cobalt extractable by ion exchange, iii. extracting the cobalt from the leach solution with a cationic ion exchange reagent, and, iv. recovering substantially all the cobalt from the ion exchange reagent by elution.

DESCRIPTION OF THE PREFERRED EMBODIMENTS

The preferred embodiment of the method is practised on an ammoniacal solution which is barren of metal values save for its cobalt content. The solution, therefore, is typical of raffinates from an LIX solvent extraction operation on pregnant ammoniacal solutions, such as might result, for example, from the ammoniacal-leaching of deep sea manganese nodules.

The redox potential of a given metal-bearing ammoniacal solution will depend specifically on the conditions used in the leaching operation. For the purposes of the present invention, however, the solution redox potential must be adjusted into the range +20 to −150 mV as measured by a platinum and calomel standard electrode pair. A particularly preferred range is 0 to −100 mV. The means to adjust the redox potential may include the addition of reducing gases, such as hydrogen or carbon monoxide to the solution, but, in the preferred case, the adjustment is made autogeneously by the carbon required for the subsequent step as described hereinbelow.

To render the cobalt extractable, the redox-adjusted solution is allowed to make contact with a carbonaceous material, advantageously contained in a column. It is possible to use a wide variety of carbonaceous substances such as lignite coal, activated carbon and coconut charcoal, but activated carbon has been found superior to all other forms. The term "activated carbon" is used herein according to its recognized chemical meaning. This is defined, for example, in "Chambers Dictionary of Science & Technology", 1971, to be a "carbon obtained from vegetable matter by carbonization in the absence of air . . .".

The quantity of carbon required in the method is very small since it apparently acts as a catalyst and is not consumed at any significant rate even though the redox potential of the solution is lowered as a result of its presence. Theoretically, since the indications are that the reaction is catalytic, there is no lower limit on the amount of carbon required, provided sufficient time is allowed for the reaction to take place. Even in practice, however, satisfactory batch conversions have been achieved with less than 1 weight percent carbon, although the reaction times in this case were about one hour. It will be appreciated, therefore, that the reaction time and quantity of carbon are interdependent and there is an optimum set of conditions under which the invention is most advantageously practised. It is preferred to use the method to treat solutions by having them flow continuously over a fixed bed of carbon contained in a column that provides a contact time of at least 2 to 3 minutes. Obviously, the particular geometry of the system will determine the specific quantity of carbon required. The activated carbon is sized so as to allow easy passage of the solution through the column. Usually, sizes greater than about 0.1 inch are used but it is also obvious that, in embodiments using a stirred vessel rather than a column reactor, the use of much finer material is possible.

After treatment with carbon, the ammoniacal solution is in condition for cobalt ion exchange. One ion exchange reagent that may be used in the method is Amberlite IRC-84 (Trade Mark), a cationic resin with a carboxylic acid functional group made by the Rohm & Hass Company. This has been found to be a particularly good ion exchange medium but any organic substance that functions as a cationic ion exchange reagent, liquid or solid, would suffice. Other successful reagents, for example, are diethylhexyl phosphoric acid and Amberlite IRC-120 (Trade Mark) and XE-318 (Trade Mark), both made by the Rohm & Hass Company. In this, the preferred case, the ion exchange takes place with solid resin in an ion exchange column but other equipment may be used especially if the ion exchange reagent is a liquid. Normally, the ion exchange and carbon treatment are conducted as separate operations but this is not essential since cobalt has been recovered successfully from a solution brought into contact with a mixture of carbon particles and an ion exchange resin.

The operating temperature is not critical to the process since the kinetics are only slightly temperature dependent. Typically, the temperature of the ammoniacal solution will be dictated by the original leaching operation.

Following ion exchange, the cobalt-diminished solution is free to be returned to the leaching operation. The cobalt-loaded organic medium may be treated by conventional means to recover a pure cobalt eluate and simultaneously regenerate the ion exchange reagent for further removal of the cobalt from the raffinate.

In an alternative embodiment, the method of the invention is used to extract cobalt from an ammoniacal solution which contains primarily nickel and copper. The metal-bearing ammoniacal leach solution is treated with a carbonaceous substance according to the method outlined above. The resulting solution is then ion exchanged with one of the described reagents for cobalt.

By this method, preferential loading of the cobalt occurs, but it is found that only about half the cobalt loads onto the ion exchange reagent when compared with tests conducted in the absence of nickel and copper. Furthermore, it has also been found that, before equilibrium is reached, small amounts of nickel and copper are picked up by the resin and these ultimately appear in the cobalt eluate after stripping. These limitations, therefore, make it preferable to extract cobalt in the absence of nickel and copper but it will be appreciated that this embodiment is still of value to the art because, by its use, at least some of the cobalt is bled from the leach circuit.

Without wishing to be bound by the explanation, the means by which cobalt is rendered extractable by the method of the present invention appears to reside in the property of certain forms of carbon to catalyse the conversion of cobalt ammine complexes. It is known that in ammonia-ammonium carbonate solutions various cobalt ammine complexes are present after oxidative leaching. One such complex is cobalt tetrammine carbonate $[Co(NH_3)_4CO_3]^+$, which can be converted to cobalt hexammine, $[Co(NH_3)_6]^{+++}$, according to the reaction:

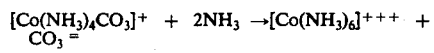

It is to be noted that in both these cobalt ammine complexes, cobalt is in the trivalent state. The terammine complex will not load onto organic reagents and this fact, coupled with the high yields of tetrammine cobalt in ammoniacal leaching systems, has given rise in the past to the axiom that trivalent cobalt in ammoniacal systems is essentially non-extractable by organic reagents. The tetrammine species, and other cobaltic ammine complexes which are present in smaller amounts, are metastable, however, tending to be converted slowly to the hexammine form which we have found to be readily extracted by the organic reagents referred to in this invention. Normally, the rate of conversion is so slow as to be useless for any practical means of recovering cobalt. It is the acceleration of the reaction in which cobaltic ammines are converted to cobaltic hexammines by carbonaceous substances, particularly in a certain redox potential range, that is felt to be the theoretical basis for the invention. This explanation, however, must be qualified by the fact that large areas of cobalt ammine chemistry are still deeply theoretical. All that is known is that the procedure described herein results in a cobalt species that may be successfully recovered by ion exchange and elution.

Finally, although the present invention is concerned with trivalent cobalt, it is recognized that divalent cobalt in ammoniacal solution may be converted to the required trivalent form by oxidation prior to the steps taught herein. The following examples illustrate the practice of the method in the invention. In the examples, all quoted redox potentials were read from a platinum-calomel standard electrode pair.

EXAMPLE 1

Three liters of an ammoniacal leach solution were prepared containing 0.43 grams per liter of cobalt at a redox potential of $-70$ mV. The solution was heated to 40° C and passed over activated carbon particles contained in a column. The carbon-treated solution was passed through a second column containing Amberlite IRC-84 (Trade Mark) resin and the steady-state effluent solution was found to analyze 0.034 grams per liter cobalt thereby showing the extraction of cobalt was 92%. In a similar test with no carbon treatment, the extraction was only 14%.

Following the extraction test, the cobalt-loaded column, which contained 1.19 grams of cobalt as a result of contact with the carbon-treated ammoniacal solution, was stripped with 2.075 liters of dilute (1.8 molar) sulphuric acid solution at 40° C. 1.17 grams of cobalt were recovered which, within analytical accuracy was the total amount originally loaded on the column. It was concluded, therefore, that the cobalt species extracted by the resin was completely stripped under mild conditions of elution.

EXAMPLE 2

One liter of cobalt head solution was prepared by dissolving cobalt metal in an 8:5 ammonia-ammonium carbonate solution in the presence of carbon and under an overpressure of oxygen. The solution was adjusted into the particularly preferred redox potential range as taught herein, analyzed for both hexammine cobalt and total cobalt and then passed through a column containing 25 ml of a carboxylic acid resin, Amberlite IRC-120 (Trade Mark). After equilibration of the system, the column effluent was also analyzed for total cobalt and hexammine cobalt complexes. The results are shown in Table 1.

TABLE 1

| Resin Loading of Cobalt Ammine Complexes | | |
|---|---|---|
| | Cobalt Concentration (g/L) | |
| | Hexammine | Total Co |
| Head Solution | 0.136 | 0.285 |
| Effluent Sol'n. | <0.01 | 0.138 |

The results show clearly that, within analytical accuracy, cobalt in the leach solution is present only in the trivalent state and is distributed about equally between cobalt hexammine and other cobalt ammine forms. The hexammine complex is loaded completely by the resin whereas the non-hexammine species are essentially untouched.

EXAMPLE 3

250 ml of an 8:5 ammonia-ammonium carbonate head solution containing 0.169 g/L total cobalt and 0.044 g/L cobalt as hexammine and having a Pt - S.C.E. mV reading of zero were mixed with 10 grams of activated carbon. The mixture was held at 50° C for 60 minutes and the mV reading recorded. The carbon was then filtered off and the solution analyzed. In a second test, 9 grams of the recovered carbon were subsequently added to another 250 ml aliquot of the same head solution and also held for 60 minutes and filtered. 8 grams of the recovered carbon were then run in a third test using the same conditions. The results of the three tests are shown in Table II.

TABLE II

| Effect of Activated Carbon on Solution Redox Potential and Cobalt Hexammine Formation | | | |
|---|---|---|---|
| Test | Carbon (g) | mV Reading | % Cobalt as Hexammine |
| Head | — | 0 | 38 |
| 1 | 10 | −130 | 47 |
| 2 | 9 | −100 | 70 |
| 3 | 8 | −85 | 77 |

The results of these tests show that carbon is not only a catalyst in the conversion of lower cobalt ammine species to hexammine but is also capable of lowering the solution redox potential. The influence of the solution redox potential on the conversion is also well demonstrated since the hexammine yield increased with a change in redox from −130 mV to −85 mV, even though the quantity of activated carbon present was less. Conversions have, in fact, been found to take place at redox potentials as low as −150 mV and as high as +20 mV.

EXAMPLE 4

Three aliquots of an ammonia-ammonium sulphate solution were taken, each containing 0.50 g/L cobalt at a redox potential of −20 mV and which, for purposes of later comparison, had been passed over an IRC-84 (Trade Mark) resin to eliminate any small amounts of naturally occurring cobalt hexammine. The first was set aside as a blank and the second and third were contacted with lignite coal and coconut charcoal respectively. All three samples were then treated with the ion exchange reagent, Amberlite IRC-84 (Trade Mark), and the effluent solutions were analyzed for cobalt. The results are shown in Table III.

TABLE III
The Effect of Carbonaceous Materials on Cobalt Extraction

| Test | Carbonaceous Material | Head Solution Cobalt (g/L) | Effluent Solution Co (g/L) | % Cobalt Extracted |
|---|---|---|---|---|
| 1 | Blank | 0.50 | 0.50 | 0 |
| 2 | Lignite Coal | 0.50 | 0.40 | 20 |
| 3 | Coconut Charcoal | 0.50 | 0.09 | 82 |

It is seen that the lignite coal and coconut charcoal were both successful, albeit to different degrees, in rendering the cobalt extractable.

EXAMPLE 5

An ammonia-ammonium carbonate solution containing 4.46 g/L nickel, 0.51 g/L copper and 0.45 g/L cobalt at 20° C and a redox potential of 0 mV was contacted with activated carbon in a column. The solution was then passed over a second column containing an ion exchange reagent Amberlite IRC-84 (Trade Mark). After an initial equilibration period to reach steady state operation, the column effluent solutions were analyzed and the results are shown in Table IV.

TABLE IV
Extraction of Cobalt in Presence of Nickel and Copper

|  | Ni | Cu | Co |
|---|---|---|---|
| Leach Solution g/L | 4.46 | 0.51 | 0.45 |
| IX Column Effluent g/L | 4.4 | 0.52 | 0.24 |
| % Extraction | 0 | 0 | 54 |

It can be seen that about half the cobalt was successfully extracted without removing nickel or copper.

As a follow-up to this test, a sample of the loaded resin was stripped with dilute sulphuric acid. The resulting eluate had a Co:Ni:Cu ratio of 1:1:0.2 indicating that a small amount of nickel and copper were co-loaded with the cobalt during the equilibrium period and were recovered in the cobalt eluate.

EXAMPLE 6

An ammoniacal leach solution containing nickel, copper and cobalt and having a Ni/Co ratio of 114:1 was treated with LIX (Trade Mark) to recover the nickel and copper. The redox of the cobalt-bearing raffinate was adjusted to −80 mV and the solution was then brought into contact with carbon and then extracted with diethylhexyl phosphoric (D2EHPA) acid according to the method of the present invention. The loaded D2EHPA was stripped with an ammonium sulphate-dilute sulphuric acid mixture and an eluate was recovered in which the Ni:Co ratio was 0.017:1. The ratio of nickel to cobalt thus changed by a factor of 6,700 from the leach solution to the eluate and the cobalt eluate was, correspondingly, of very high purity.

EXAMPLE 7

2.1 liters of an ammoniacal leach solution at a redox potential of −30 mV containing 0.519 g/L cobalt was fed continuously over a mixed bed of activated carbon and ion exchange resin particles contained in a column. The effluent solution analyzed 0.037 g/L cobalt thereby showing that 93 percent of the cobalt had been extracted from the solution. The resin, which contained 0.85 g of cobalt as a result of the extraction step, was eluted with dilute sulphuric acid to produce an eluate containing a total of 0.83 g of cobalt. Within the limits of analytical accuracy, therefore, cobalt was completely stripped from the resin.

What I claim is:

1. A method of recovering cobalt from ammoniacal solution comprising bringing the solution into contact with carbonaceous material, the solution redox potential being in the range +20 to −150 mV as measured by a platinum-calomel standard electrode pair, extracting the cobalt from the leach solution with a cationic ion exchange reagent, and, recovering substantially all the cobalt from the ion exchange reagent by elution.

2. Method according to claim 1 in which the ammoniacal solution is separated from the carbonaceous material before the cobalt is extracted from the solution by ion exchange.

3. Method according to claim 2 in which the leach solution also contains nickel and copper.

4. Method according to claim 2 in which the ion exchange reagent is a cationic resin with a carboxylic acid functional group.

5. Method according to claim 2 in which the ion exchange reagent is a cationic resin with a sulphonic acid functional group.

6. Method according to claim 2 in which the ion exchange reagent is a diethylhexyl phosphoric acid.

7. Method according to claim 2 in which the carbonaceous material is activated carbon.

8. In the method of treating deep sea manganese nodules by reduction and leaching with ammoniacal solution wherein a pregnant liquor results containing primarily nickel and copper with minor amounts of cobalt, and the copper and nickel are removed from the liquors by solvent extraction leaving behind an ammoniacal raffinate, containing substantially all the cobalt originally in the present solution, the raffinate being ultimately recycled for further leaching of nodules, the improvement comprising recovering the cobalt from the ammoniacal raffinate before recycling by,
   i. adjusting the redox potential of the solution into the range +20 to −150 mV as measured by a platinum-calomel standard electrode pair,
   ii. bringing the solution into contact with carbonaceous material, thereby rendering the cobalt extractable by ion exchange,
   iii. extracting the cobalt from the leach solution with a cationic ion exchange reagent, and, iv. recovering substantially all the cobalt from the ion exchange reagent by elution.

9. Method according to claim 1 in which the leach solution also contains nickel and copper.

10. Method according to claim 9 in which the ion exchange reagent is a cationic resin with a carboxylic acid functional group.

11. Method according to claim 9 in which the ion exchange reagent is a cationic resin with a sulphonic acid functional group.

12. Method according to claim 9 in which the ion exchange reagent is diethylhexyl phosphoric acid.

13. Method according to claim 9 in which the carbonaceous material is activated carbon.

14. Method according to claim 1 in which the ion exchange reagent is a cationic resin with a carboxylic acid functional group.

15. Method according to claim 1 in which the ion exchange reagent is a cationic resin with a sulphonic acid functional group.

16. Method according to claim 1 in which the ion exchange reagent is diethylhexyl phosphoric acid.

17. Method according to claim 1 in which the carbonaceous material is activated carbon.

18. Method according to claim 8 in which the leach solution also contains nickel and copper.

19. Method according to claim 8 in which the ion exchange reagent is a cationic resin with a carboxylic acid functional group.

20. Method according to claim 8 in which the ion exchange reagent is a cationic resin with a sulphonic acid functional group.

21. Method according to claim 8 in which the ion exchange reagent is a diethylhexyl phosphoric acid.

22. Method according to claim 8 in which the carbonaceous material is activated carbon.

* * * * *